United States Patent
Chen et al.

(10) Patent No.: US 7,209,297 B2
(45) Date of Patent: Apr. 24, 2007

(54) SOFT ZOOM LENS SYSTEM

(75) Inventors: Chao-Chang Chen, Taipei (TW);
Kuo-Cheng Huang, Hsin-Chu (TW);
Wei-Cheng Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 48 days.

(21) Appl. No.: 11/217,323

(22) Filed: Sep. 2, 2005

(65) Prior Publication Data

US 2007/0014029 A1  Jan. 18, 2007

(51) Int. Cl.
*G02B 15/14* (2006.01)
(52) U.S. Cl. .............. 359/676; 359/691; 359/694
(58) Field of Classification Search ........... 359/676, 359/691, 694
See application file for complete search history.

(56) References Cited

U.S. PATENT DOCUMENTS 6,952,313 B2 * 10/2005 Schrader .............. 359/666
2006/0028734 A1 * 2/2006 Kuiper et al. ......... 359/676

* cited by examiner

*Primary Examiner*—Jordan M. Schwartz
(74) *Attorney, Agent, or Firm*—Troxell Law Office, PLLC

(57) ABSTRACT

A soft zoom lens system includes an axially expandable or shrinkable holding portion, a supporting portion, a first lens and a second lens. This holding portion has an inner space, a first end and a second end. The supporting portion is made by a soft material. The first lens is disposed between the first end and the supporting portion. The second lens is disposed between the second end and the supporting portion. When this holding portion is applied by predetermined electricity, it will expand or to shrink axially. So, the curvatures of the first lens and the second lens will be changed. The zooming is performed. The invention's structure is simple. The adjusting of focal length is easy. The production is easy with low cost.

4 Claims, 4 Drawing Sheets

SOFT ZOOM LENS SYSTEM

BACKGROUND OF INVENTION

1. Field of the Invention

The present invention relates to a soft zoom lens system. Particular, it relates to a soft zoom lens system utilizing soft lenses. By changing the curvatures of the lenses, the zooming is performed. About this invention, its structure is simple. The adjusting of focal length is easy. The production is easy with low cost.

2. Description of the Prior Art

In order to take a photo (or movie) about a far or near object, the traditional camera (or video) must contain the zoom lens system to perform the zooming function. However, traditional zoom lens system has the following disadvantages:

[1]. Its structure is complicated. The traditional zoom lenses are moved by motor so that the zooming function can be achieved. Its structure is very complicated, heavy and large. If the required electricity is not enough, the motor cannot work. Thus, it causes the camera become useless.

[2]. The adjusting of zooming is complicated. About the traditional zoom lenses, they are moved and controlled by motor(s). Under some condition, only one lens needs to be moved. But under another condition, two or more lens must be moved. The controlling process is very complicated.

[3]. The cost for high-level zoom lens is high. When the camera needs to take a photo about a long distance object, a high level zoom lens is required. However, such lens is very expensive.

SUMMARY OF THE INVENTION

The primary object of the present invention is to provide a soft zoom lens system. Its structure is simple.

The next object of the present invention is to provide a soft zoom lens system. The adjusting of focal length is easy.

Another object of the present invention is to provide a soft zoom lens system. The production is easy with low cost.

The present invention is a soft zoom lens system. It comprises: a holding portion, a supporting portion, a first lens, and a second lens;

said holding portion having an inner space, a first end and a second end, said first end and said second end communicating with said inner space; said holding portion being expandable and shrinkable axially;

said supporting portion made by a soft material being disposed in said inner space of said holding portion;

said first lens being deformable and having a first surface and a second surface, said first lens being disposed in said inner space of said holding portion and between said first end and said supporting portion;

said second lens being deformable and having a first plane and a second plane, said second lens being disposed in said inner space of said holding portion and between said second end and said supporting portion;

so that when said holding portion is expanded or shrunk, curvatures of said first lens and said second lens are changed accordingly so as to perform a zooming.

DETAILED DESCRIPTION OF THE PREFERRED EMBODIMENT

Figure 1:
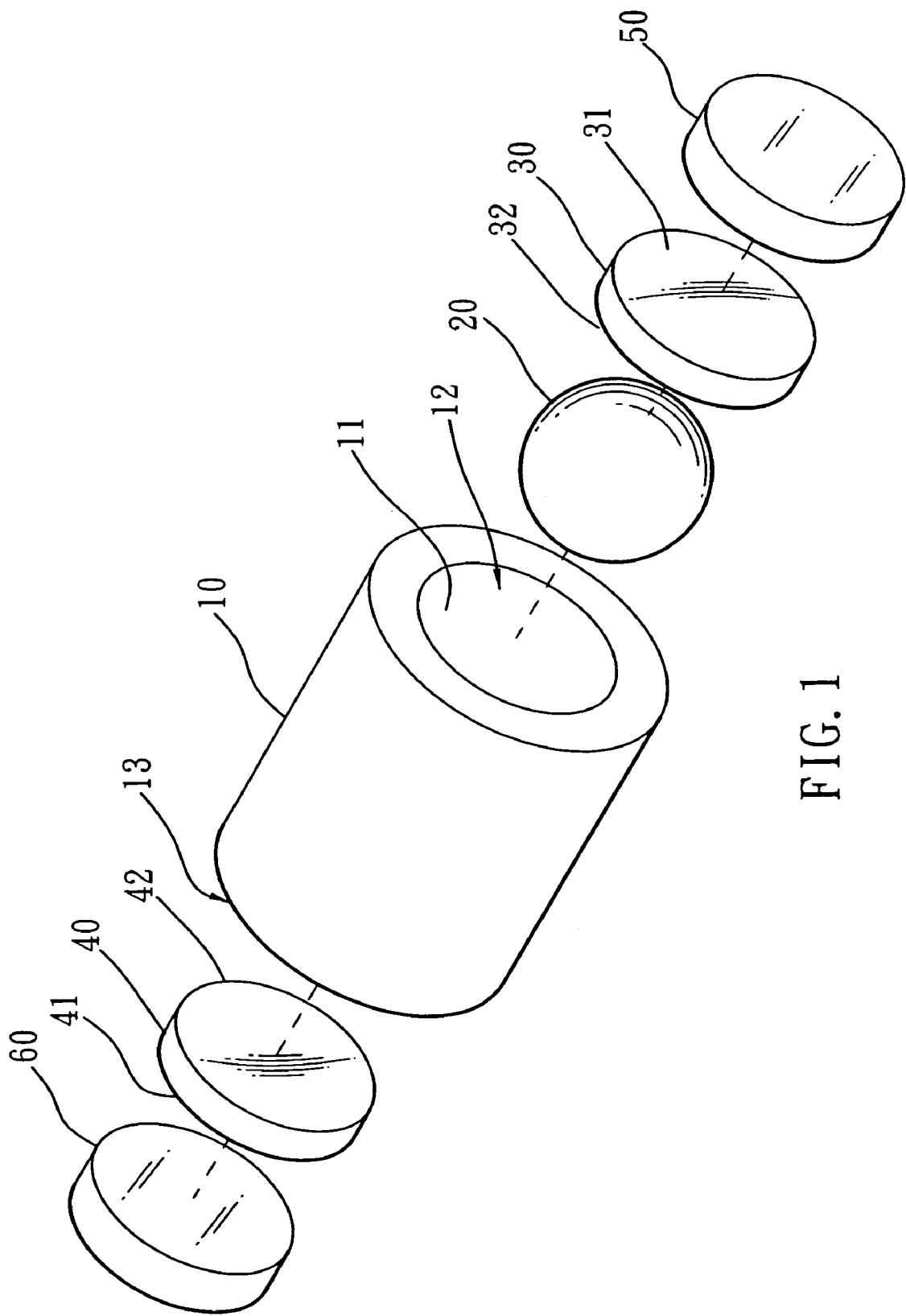
FIG. 1 is a perspective view of the disassembled structures of the first preferred embodiment of the present invention.

The present invention is relates to a soft zoom lens system. Referring to FIG. 1, it mainly comprises a holding portion 10, a supporting portion 20, a first lens 30 and a second lens 40.

With regard to this holding portion 10, it is made by an electrically conductive plastic. This holding portion 10 has an inner space 11, a first end 12 and a second end 13. The first end 12 and the second end 13 communicate with the inner space 11. The holding portion 10 can be controlled to expand or to shrink axially, when this holding portion is applied by predetermined electricity.

About this supporting portion 20, it is made by a soft material and is disposed in the inner space 11 of the holding portion 10.

The first lens 30 is deformable and has a first surface 31 and a second surface 32. The first lens 30 is disposed in the inner space 11 of the holding portion 10 and between the first end 12 and the supporting portion 20.

The second lens 40 is deformable and has a first plane 41 and a second plane 42. The second lens 40 is disposed in the inner space 11 of the holding portion 10 and between the second end 13 and the supporting portion 20.

Thus, when the holding portion 10 is expanded or shrunk, curvatures of the first lens 30 and the second lens 40 are changed accordingly so as to perform a zooming.

Figure 2:
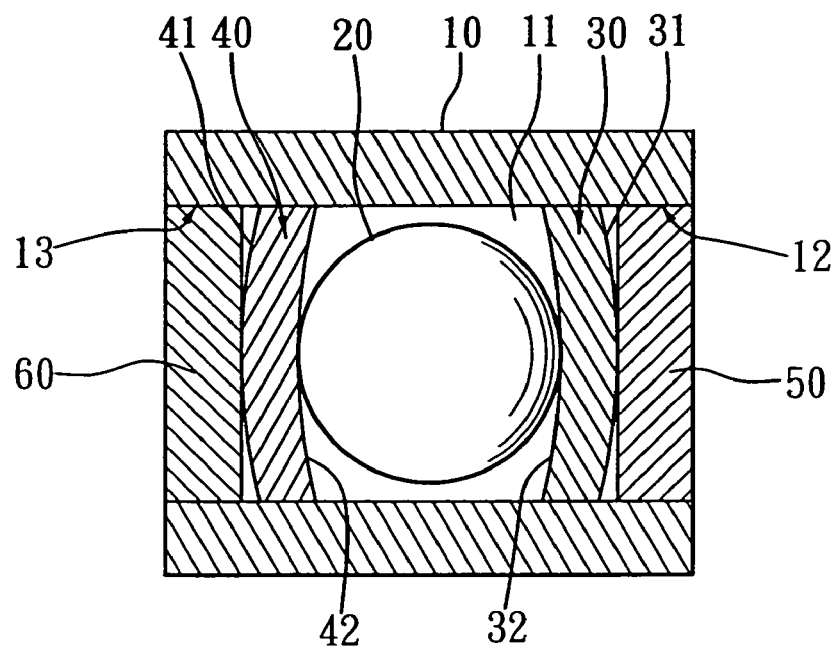
FIG. 2 is a cross-sectional view of the first preferred embodiment of this invention before shrinking.

FIG. 2 shows the first preferred embodiment of the present invention. The supporting portion 20 is a transparent spherical structure. The first lens 30 is disposed in the inner space 11 of the holding portion 10 and it also substantially contacts with the inner surface of the holding portion 10. The central portion of the first surface 31 of the first lens 30 contacts with a first conductive portion 50. The periphery of first conductive portion 50 is secured on the first end 12 of the holding portion 10. The central portion of the second surface 32 of the first lens 30 substantially contacts with the supporting portion 20.

The second lens 40 is disposed in the inner space 11 of the holding portion 10 and it also substantially contacts with the inner surface of the holding portion 10. The central portion of the first plane 41 of the second lens 40 contacts with a second conductive portion 60. The periphery of second conductive portion 60 is secured on the second end 13 of the holding portion 10. The central portion of the second plane 42 of the second lens 40 substantially contacts with the supporting portion 20.

Figure 3:
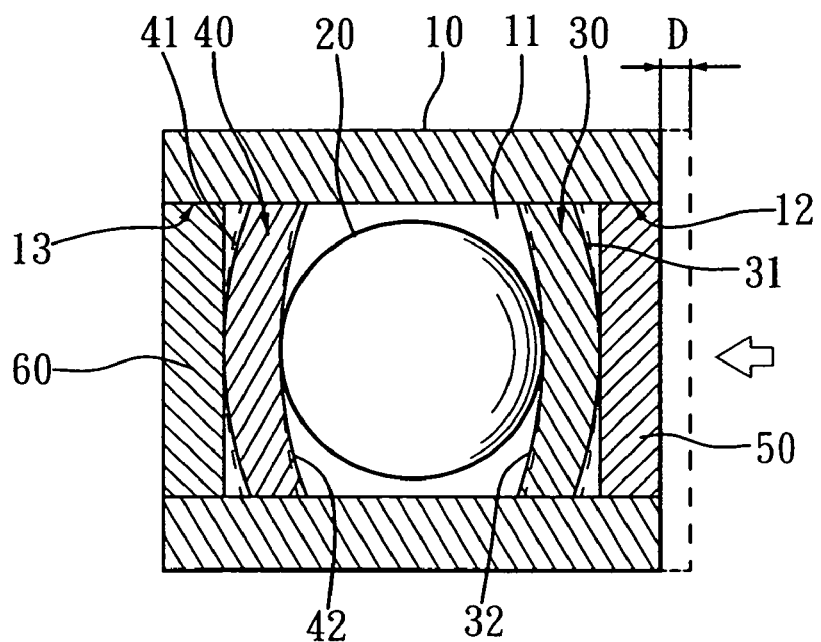
FIG. 3 is a cross-sectional view of the first preferred embodiment of this invention after shrinking.

As illustrated in FIG. 3, when this holding portion is applied by predetermined electricity, the holding portion 10 create the following actions:

First, the holding portion 10 shrinks a distance D axially. The first end 12 and the second end 30 of the holding portion 10 move toward the central part of the inner space 11 respectively.

Next, the first conductive portion 50 presses on the first surface 31 of the first lens 30. Because the central portion of the second surface 32 of the first lens 30 is supported by the supporting portion 20, the curvature of the first lens 30 will be altered. Therefore, the zooming is performed.

Also, the second conductive portion 60 presses on the first plane 41 of the second lens 40. Because the central portion of the second plane 42 of the second lens 40 is supported by the supporting portion 20, the curvature of the second lens 40 will be altered. Therefore, the zooming is performed, too.

Figure 7:
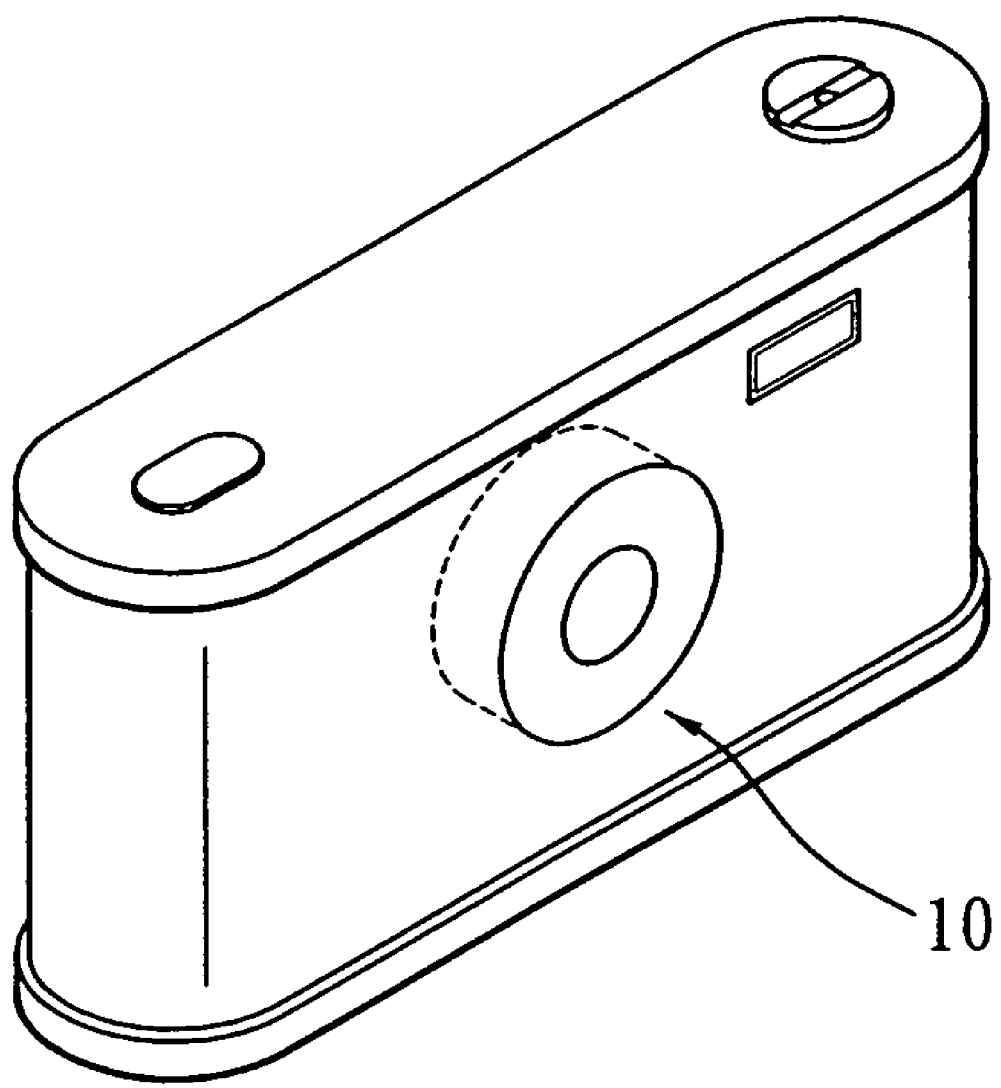
FIG. 7 is a perspective view of the application of this invention.

As shown in FIG. 7, the present invention (the soft zoom lens system) is applied on a camera. When the holding portion 10 is applied by predetermined electricity (based on testing result or analysis in advance), the curvatures of the first lens 30 and the second lens 40 can be precisely changed to a desired condition. Thus, a desired zooming effect can be created precisely and a beautiful photo can be obtained from this camera.

In this preferred embodiment, the holding portion 10 can be modified as a mechanism (not shown) that can shrink or expand axially. The supporting portion 20, the first lens 30 and the second lens 40 can be a soft material of Polydimethylsiloxane (briefly referred as PDMS). It is suitable for mass production and the cost can be lowered significantly.

The supporting portion 20 is a transparent spherical structure. Both the first conductive portion 50 and the second conductive portion 60 are transparent electrically conductive glass, such as Indium Tin Oxide (or briefly called ITO). The shape of the first conductive portion 50 and the second conductive portion 60 is selected from one-piece film or ring-shaped structure.

Figure 4:
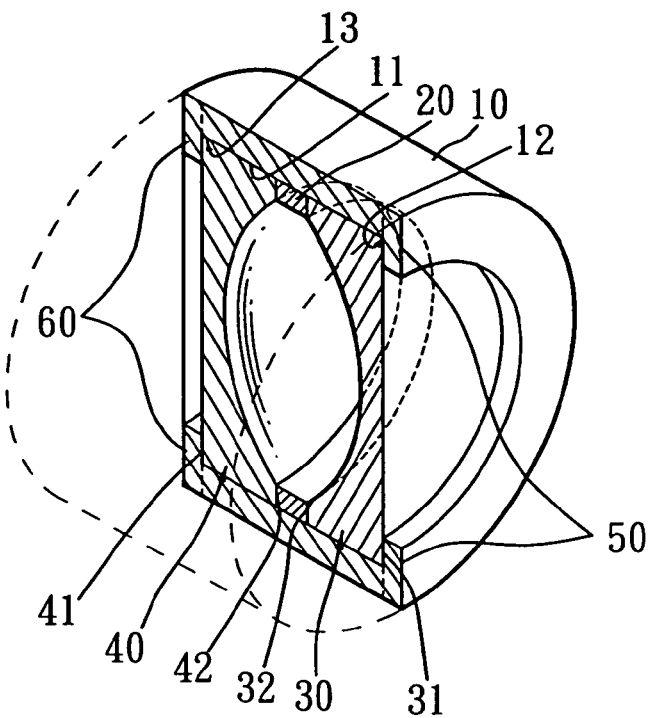
FIG. 4 shows the inner structure of the second preferred embodiment of this invention.
Figures 5, 6:
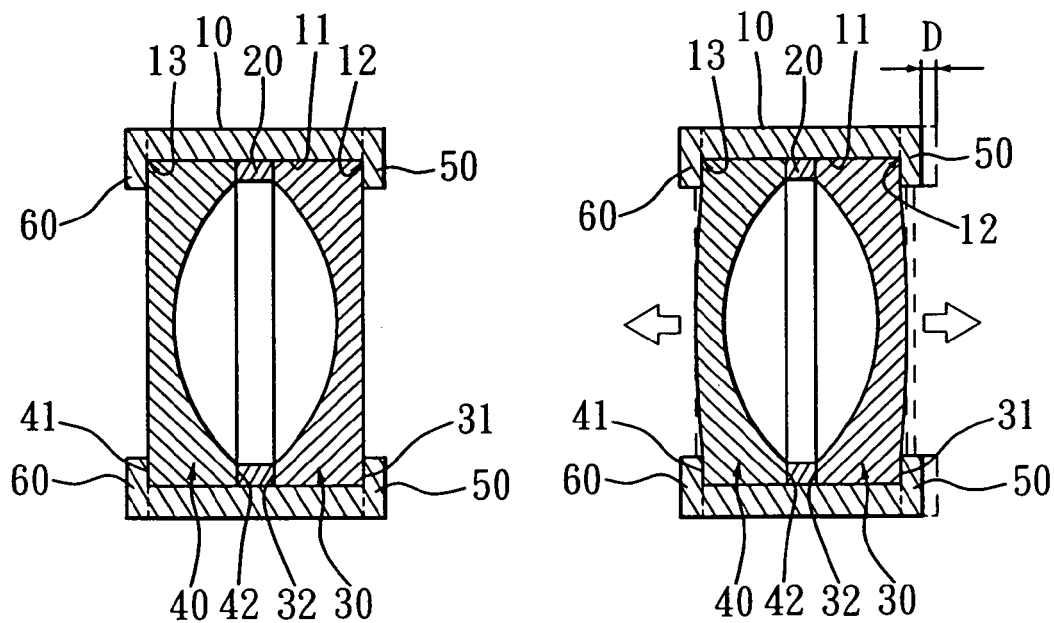
FIG. 5 is a cross-sectional view of the second preferred embodiment of this invention before shrinking.
FIG. 6 is a cross-sectional view of the second preferred embodiment of this invention after shrinking.

Referring to FIGS. 4 and 5, they show another preferred embodiment of the present invention. The first lens 30 and the second lens 40 are disposed inside the holding portion 10. The second surface 32 of the first lens 30 and the second plane 42 of the second lens 40 are facing each other. The first conductive portion 50 is a ring-shaped structure and integrally formed on the first end 12 of the holding portion 10. It also contacts with the periphery of the first surface 31 of the first lens 30. Concerning the second conductive portion 60, it also is a ring-shaped structure and integrally formed on the second end 13 of the holding portion 10. It also contacts with the periphery of the first plane 41 of the first lens 30. In addition, the supporting portion 20 is also the ring-shaped structure and contacts the second surface 32 of the first lens 30 and the second plane 42 of the second lens 40 both.

As shown in FIG. 6, the operator can apply certain electricity on this holding portion 10. Then, it will create the following actions:

If this holding portion 10 shrinks a pre-determined distance D axially, the first end 12 and the second end 13 of the holding portion 10 move toward the central part of the inner space 11. Also, the first and second conductive portions 50, 60 will move toward the central part of the inner space 11, too.

Consequently, the first conductive portion 50 presses on the first surface 31 of the first lens 30. Because the periphery of the second surface 32 of the first lens 30 is limited by the supporting portion 20, the curvature of the first lens 30 is changed. Thus, its focal length will be altered.

Meanwhile, the second conductive portion 60 presses on the first plane 41 of the second lens 40. Because the periphery of the second plane 42 of the second lens 40 is limited by the supporting portion 20, the curvature of the second lens 40 is changed. Thus, its focal length will be changed.

Based on such structure that can be gradually changed, the change of curvatures of the first lens 30 and the second lens 40 can be precisely controlled so that a desired zooming is performed.

The holding portion 10 can be a cylindrical, square, or other shape. Or, one or more other transparent objects (like water or other lens) can be installed between the supporting portion and the neighboring lens. Even, the holding portion 10 can be controlled to be a non-proportional expanding or shrinking so that another funny or entertaining effect is obtained. All such modifications are still in the protecting scope of the present invention.

The advantages and functions of this invention can be summarized as follows:

[1]. Its structure is simple. The supporting portion is simply installed inside the holding portion. Then, the first lens and the second lens can be secured inside the holding portion. Thus, the soft zoom lens system is obtained. Its structure is quite simply.

[2]. The adjusting of focal length is easy. When this holding portion is applied by certain electricity, the expanding or shrinking of this holding portion can be controlled. Then, the curvatures of the first lens and the second lens will be changed. The zooming effect is quickly performed.

[3]. The production is easy with low cost. In this invention, the focus-controlling portions (such as the supporting portion, the first lens and the second lens, etc.) can be made by Polydimethylsiloxane (PDMS), so the cost can be significantly lowered.

The above embodiments are only used to illustrate the present invention, not intended to limit the scope thereof. Many modifications of the above embodiments can be made without departing from the spirit of the present invention.

What is claimed is:

1. A soft zoom lens system, comprising a holding portion, a supporting portion, a first lens, and a second lens;

said holding portion having an inner space, a first end and a second end, said first end and said second end communicating with said inner space; said holding portion being expandable and shrinkable axially;

said supporting portion made by a soft material being disposed in said inner space of said holding portion;

said first lens being formed of a solid deformable material and having a first surface and a second surface, said first lens being disposed in said inner space of said holding portion and between said first end and said supporting portion;

said second lens being formed of a solid deformable material and having a first plane and a second plane, said second lens being disposed in said inner space of said holding portion and between said second end and said supporting portion;

so that when said holding portion is expanded or shrunk, curvatures of said first lens and said second lens are changed accordingly so as to perform a zooming.

2. The zoom lens system as claimed in claim 1, wherein:

said first lens is disposed in the inner space of the holding portion and also substantially contacts with an inner surface of the holding portion; a central portion of the first surface of the first lens contacts with a first conductive portion; a periphery of first conductive portion is secured on the first end of the holding portion; a central portion of the second surface of the first lens substantially contacts with the supporting portion;

said second lens is disposed in the inner space of the holding portion and also substantially contacts with an inner surface of the holding portion; a central portion of the first plane of the second lens contacts with a second conductive portion; a periphery of second conductive portion is secured on the second end of the holding portion; a central portion of the second plane of the second lens substantially contacts with the supporting portion.

3. The zoom lens system as claimed in claim 2, wherein:

said first conductive portion and said second conductive portion are transparent electrically-conductive glass of Indium Tin Oxide; the shape of said first conductive portion and said second conductive portion is selected from one-piece film or ring-shaped structure;

said first conductive portion is integrally formed on said first end;

said second conductive portion is integrally formed on said second end.

4. The zoom lens system as claimed in claim 1, wherein:

said holding portion is made by an electrically conductive plastic; said holding portion can be controlled to expand or to shrink axially, when this holding portion is applied by predetermined electricity;

the shape of the supporting portion is a transparent spherical structure;

said soft material is Polydimethylsiloxane (PDMS).

* * * * *